United States Patent
Arai

[19]

[11] Patent Number: 5,886,416
[45] Date of Patent: Mar. 23, 1999

[54] ELECTRICITY-GENERATION CONTROL SYSTEM FOR VEHICLE

[75] Inventor: Hideaki Arai, Saitama, Japan

[73] Assignee: Honda Giken Kogyo Kabushiki Kaisha, Tokyo, Japan

[21] Appl. No.: 821,166

[22] Filed: Mar. 20, 1997

[30] Foreign Application Priority Data

Mar. 22, 1996 [JP] Japan .................................. 8-065725

[51] Int. Cl.$^6$ ...................................................... H02P 9/04
[52] U.S. Cl. ..................... 290/40 C; 290/40 A; 123/352; 180/197
[58] Field of Search ................................. 290/11, 17, 25, 290/34, 40 R, 40 A, 40 C, 51; 123/352; 180/197

[56] References Cited

U.S. PATENT DOCUMENTS

| | | | |
|---|---|---|---|
| 4,834,045 | 5/1989 | Imai et al. | 123/352 |
| 4,917,208 | 4/1990 | Komoda | 180/197 |
| 5,474,369 | 12/1995 | Inagaki et al. | 303/146 |
| 5,542,754 | 8/1996 | Aoki et al. | 303/3 |
| 5,545,928 | 8/1996 | Kotani | 290/40 C |
| 5,583,406 | 12/1996 | Mutoh et al. | 318/376 |

FOREIGN PATENT DOCUMENTS 4-135936   5/1992   Japan .

*Primary Examiner*—Thomas M. Dougherty
*Assistant Examiner*—Nicholas Ponomarenko
*Attorney, Agent, or Firm*—Armstrong, Westerman, Hattori, McLeland, & Naughton

[57] ABSTRACT

If a decelerating-state detecting device detects a decelerating state of a vehicle, an electricity-generation control device allows a dynamo to generate electricity through a regulator, thereby recovering a kinetic energy of the vehicle, wastefully consumed by braking, as electric energy to charge a battery. At the same time, a braking-force control device controls the opening of a throttle valve through an actuator, thereby decreasing the braking force generated by a pumping load of an engine to prevent a variation in total braking force, so that a sense of incompatibility is prevented from being felt by a driver. Even if the opening of an exhaust valve of an exhaust brake device is controlled instead of controlling the opening of the throttle valve, a similar function and effect can be achieved. Thus, it is possible to avoid a variation in braking force during deceleration of the vehicle, while suppressing the consumption of an engine power output due to the driving of the dynamo to a minimum.

6 Claims, 8 Drawing Sheets

ELECTRICITY-GENERATION CONTROL SYSTEM FOR VEHICLE

BACKGROUND OF THE INVENTION

1. Field of the Invention

The present invention relates to an electricity-generation control system for a vehicle for controlling the electricity-generating state of a dynamo driven by an engine.

2. Description of the Related Art

A battery for supplying an electric power to auxiliaries of a vehicle is charged by a dynamo driven by an engine. However, there is a problem that a portion of an engine power output is consumed by the load of dynamo if the generation of electricity is conducted during acceleration of the vehicle or during travelling of the vehicle at a constant speed. Therefore, if the dynamo is operated only during deceleration of the vehicle, as described in Japanese Patent Application Laid-open No. 4-135936, the dynamo can be driven by a kinetic energy of the vehicle which is otherwise intrinsically and wastefully consumed by braking. Thus, the wasteful consumption of the engine power output is avoided.

However, there is a problem that, if the dynamo is operated during deceleration of the vehicle as described above, the vehicle is brought into a condition in which an apparent engine brake acts excessively under an influence of the load of the dynamo and the vehicle is decelerated more than a driver's expectation, causing the driver a sense of incompatibility.

SUMMARY OF THE INVENTION

Accordingly, it is an object of the present invention to avoid a variation in braking force during deceleration of the vehicle, while suppressing the consumption of an engine power output due to the driving of the dynamo to a minimum.

To achieve the above object, according to a first aspect and feature of the present invention, there is provided an electricity-generation control system for a vehicle, comprising a decelerated-state detecting means for detecting a decelerating state of the vehicle, an electricity-generation control means for controlling the electricity-generating state of a dynamo driven by an engine, and a braking-force control means for controlling a braking force generated by a pumping load of the engine by controlling an opening degree of a throttle valve provided in an intake passage of the engine or of an exhaust valve provided in an exhaust passage of the engine by an actuator, wherein when the decelerated-state detecting means detects the decelerating state of the vehicle, the electricity-generation control means allows the dynamo to generate electricity, and the braking-force control means decreases the braking force in accordance with an amount of electricity generated by the dynamo.

With the first feature of the present invention, it is possible to prevent the load of the dynamo from being applied to the engine during acceleration of the vehicle or during travelling of the vehicle at a constant speed, thereby providing an enhancement in acceleration performance and a reduction in fuel consumption, and to effectively recover the kinetic energy of the vehicle, wastefully consumed during deceleration by braking, as electric energy. In addition, an increase in total braking force of the vehicle caused by the driving of the dynamo can be offset by a decrease in braking force caused by a decrease in pumping load of the engine, thereby preventing the deceleration of the vehicle from becoming excessive to avoid a sense of incompatibility felt by the driver.

According to a second aspect and feature of the present invention, in addition to the first feature, the decreasing of the braking force is performed by controlling the opening of the throttle valve, and during this time, a cutting of fuel is carried out.

With the second feature of the present invention, since the cutting of fuel is carried out during controlling of the opening of the throttle valve, the pumping load of the engine can be decreased while suppressing the wasteful consumption of fuel.

According to a third aspect and feature of the present invention, in addition to the first feature, the electricity-generation control system further includes a battery voltage sensor for detecting a voltage of the battery charged by the dynamo, wherein when the voltage of he battery is equal to or greater than a predetermined value, the electricity-generation control means prohibits the generation of electricity by the dynamo.

With the third feature of the present invention, it is possible to prevent damage to the battery by avoiding an over-charging.

According to a fourth aspect and feature of the present invention, in addition to the first feature, the decelerated-state detecting means detects the decelerating state of the vehicle when an opening degree of an accelerator or the opening degree of the throttle valve is a value corresponding to a fully-closed state thereof.

With the fourth feature of the present invention, the decelerated state of the vehicle can be easily and reliably detected, when the accelerator opening degree or the throttle opening degree is the value corresponding to the fully-closed state.

The above and other objects, features and advantages of the invention will become apparent from the following description of the preferred embodiments taken in conjunction with the accompanying drawings.

DESCRIPTION OF THE PREFERRED EMBODIMENTS

The present invention will now be described by way of preferred embodiments with reference to the accompanying drawings.

Figure 1:
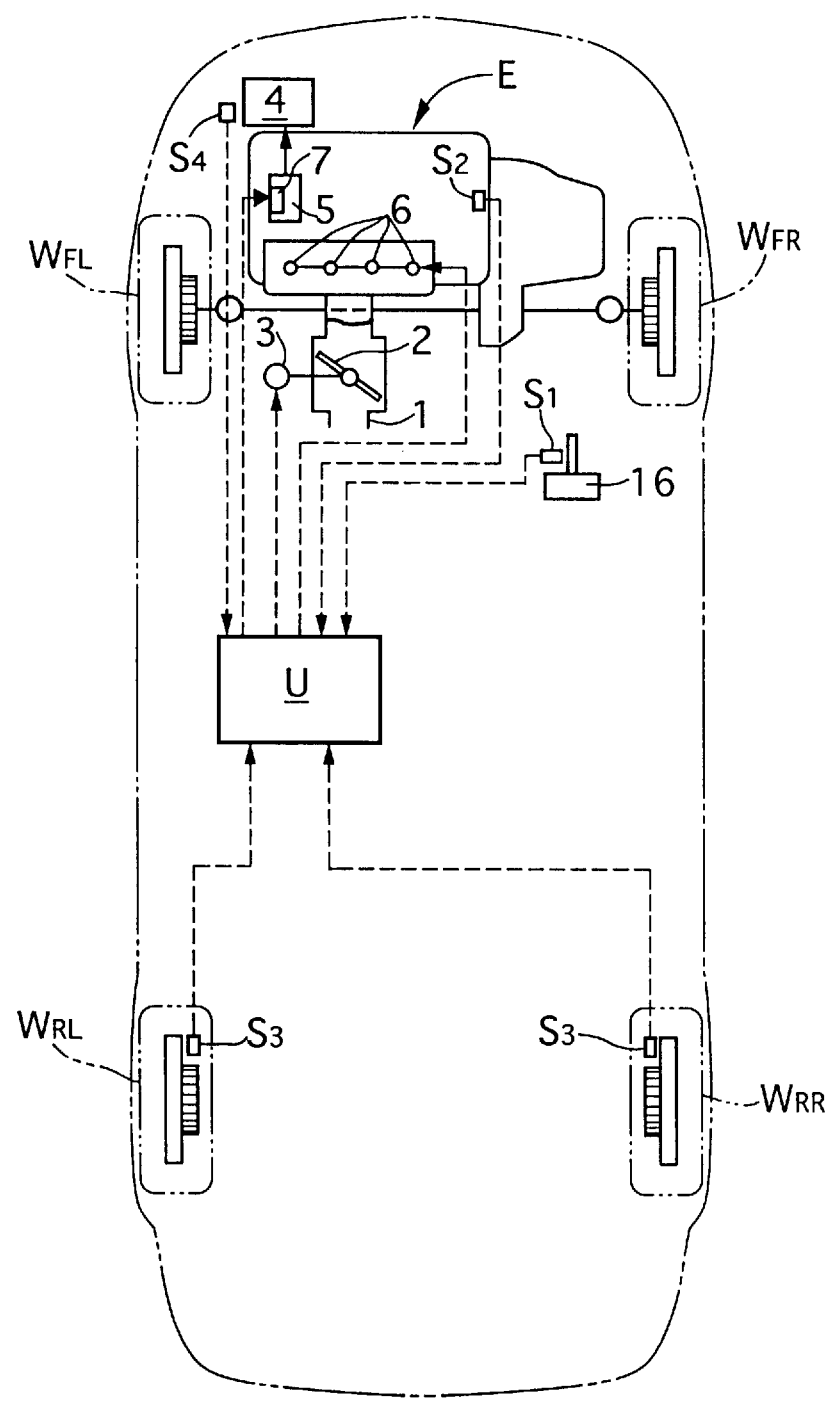
FIG. 1 is a diagrammatic illustration of the entire arrangement of a vehicle including an electricity-generation control system according to the present invention.

Referring to FIG. 1, there is shown a vehicle which is a front wheel drive vehicle. The vehicle includes a pair of left and right driven wheels $W_{FL}$ and $W_{FR}$ to which a driving force from an engine E is transmitted through a transmission, and a pair of left and right follower wheels $W_{RL}$ and $W_{RR}$ which are rotated with travelling of the vehicle. A throttle valve 2 is incorporated in an intake passage 1 of the engine E, so that the opening and closing of the throttle valve 2 are controlled by an actuator 3 which includes a pulse motor connected to an electronic control unit U. Further controlled by the electronic control unit U are the amount of electricity generated in a dynamo 5 which is driven by the engine E to charge a battery 4 for supplying an electric power to auxiliaries and the like, and the amount of fuel injected from fuel injection valves 6 mounted downstream from the intake passage 1.

An accelerator opening degree sensor $S_1$ for detecting an accelerator opening degree $\theta_{AP}$ is mounted on an accelerator pedal 16. An engine revolution-number sensor S2 for detecting the number Ne of revolutions of the engine E is mounted in the engine E, and vehicle speed sensors $S_3$ for detecting a vehicle speed V, are mounted on the left and right follower wheels $W_{RL}$ and $W_{RR}$. A battery voltage sensor $S_4$ for detecting a voltage Vb of the battery 4 is mounted on the battery 4. Signals from the accelerator opening degree sensor $S_1$, the engine revolution-number sensor $S_2$, the vehicle speed sensors $S_3$, $S_3$ and the battery voltage sensor $S_4$ are inputted to the electronic control unit U.

Figure 2:
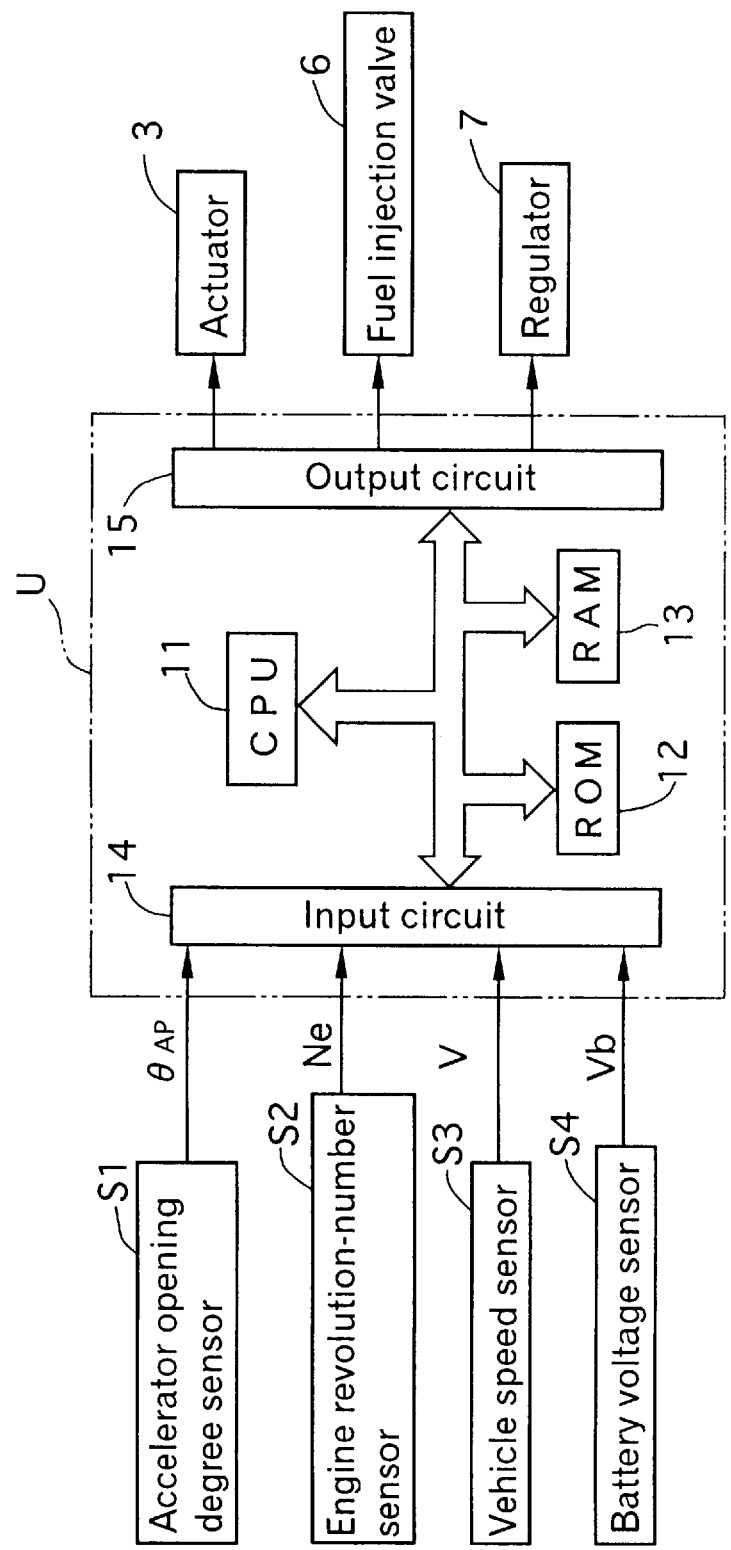
FIG. 2 is a block diagram of an electronic control unit.

FIG. 2 shows the electronic control unit U for controlling the actuator 3 for the throttle valve 2, the fuel injection valves 6 and a regulator 7 of the dynamo 5 by subjecting the signals from the sensors $S_1$ to $S_4$ to a calculation according to a control program. The electronic control unit U includes a central processing unit (CPU) 11 for carrying out the calculation, a read-only memory (ROM) 12 containing data such as the control program and various tables, a random access memory (RAM) 13 to temporarily store the output signals from the sensors $S_1$ to $S_4$ and the result of the calculation, an input circuit 14 to which the sensors $S_1$ to $S_4$ are connected, and an output circuit 15 to which the actuator 3, the fuel injection valves 6 and the regulator 7 are connected.

Figure 3:
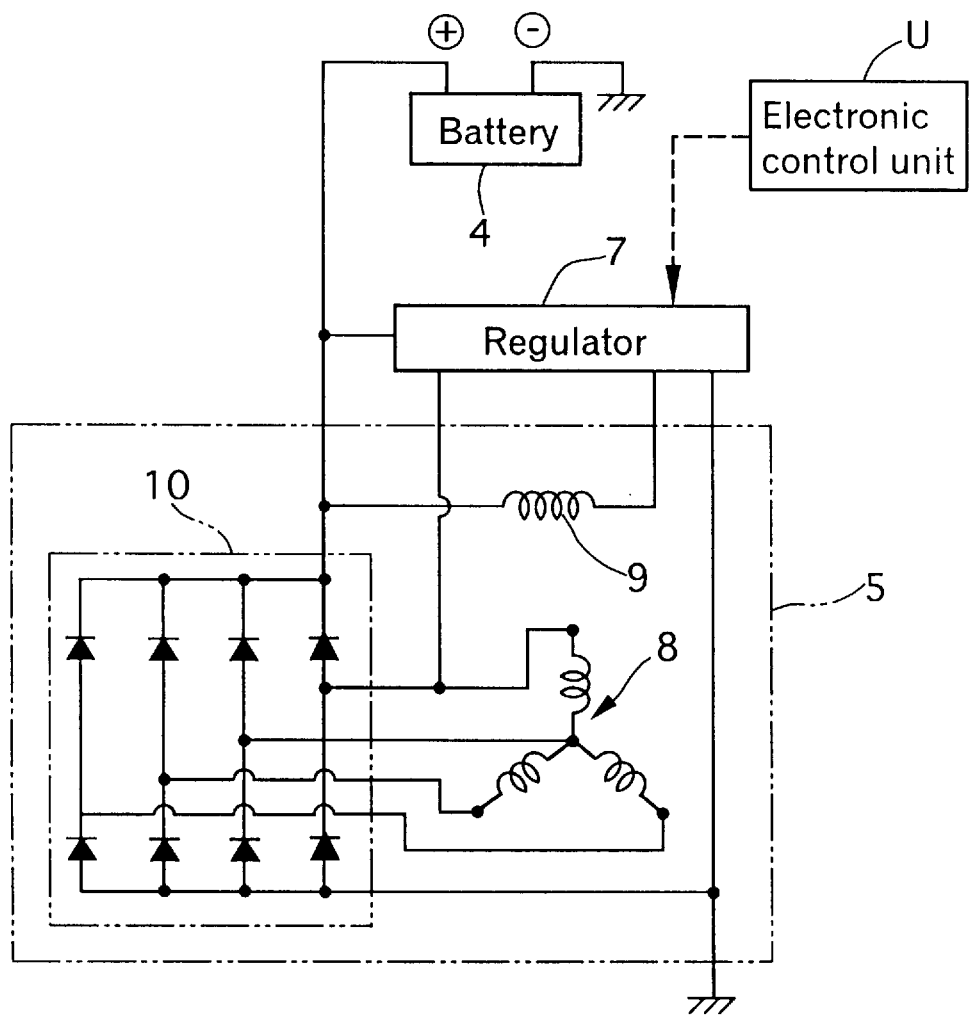
FIG. 3 is a circuit diagram of dynamo.

As shown in FIG. 3, the dynamo 5 includes a stator coil 8, a field coil 9 and a rectifier 10. Thus, the amount of electricity generated by the dynamo 5 is controlled by varying the electric current in the field coil 9 by the regulator 7 receiving a command from the electronic control unit U. If the amount of electricity generated is increased, the load of the engine E for driving the dynamo 5 is increased. If the amount of electricity generated is decreased, the load is decreased.

Figure 4:
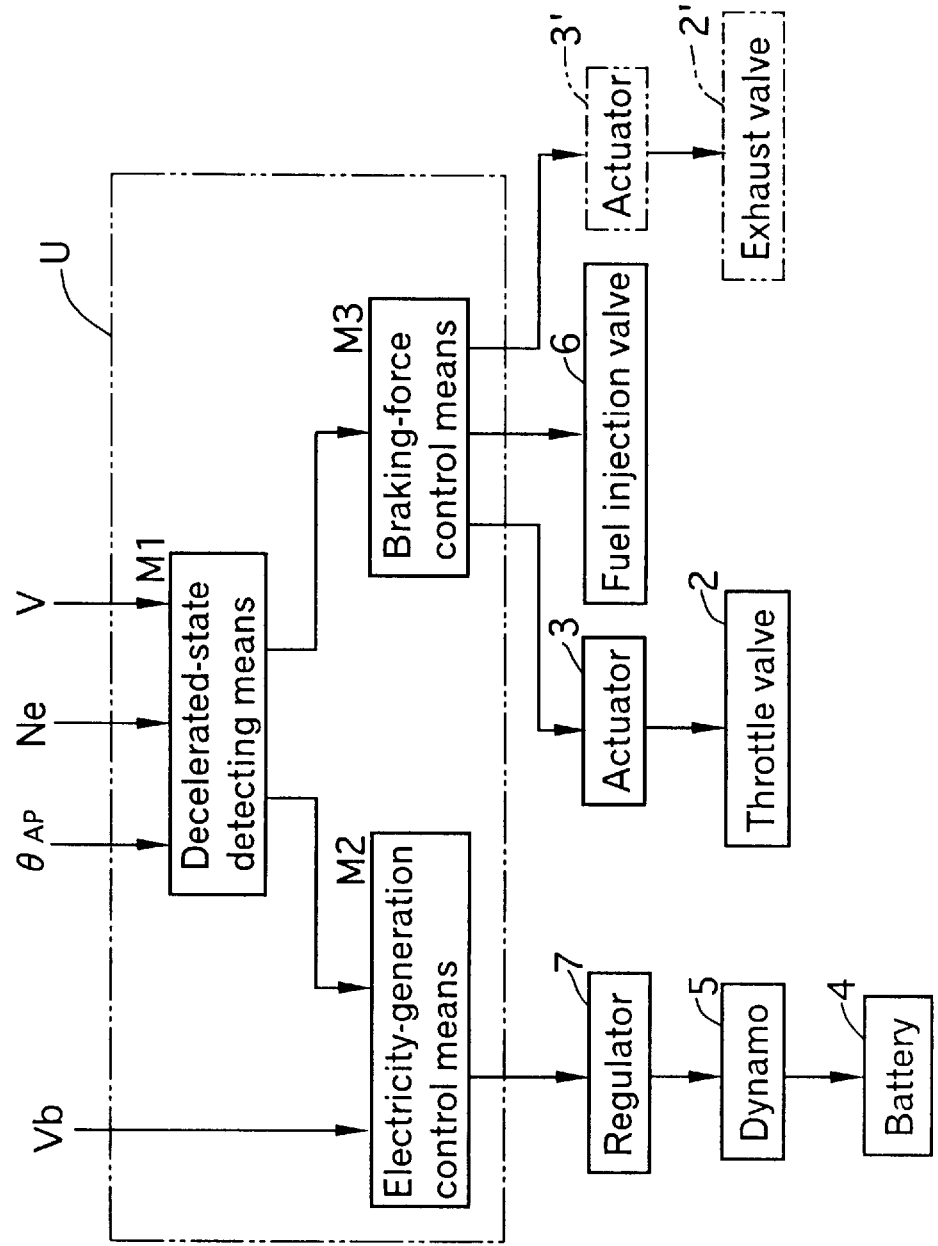
FIG. 4 is a block diagram of a control section.

As shown in FIG. 4, an electricity-generation control system includes a decelerating-state detecting means M1, an electricity-generation control means (e.g., a dynamo control means) M2, and a braking-force control means M3.

The decelerating-state detecting means M1 detects the fact that the vehicle is in a decelerating state, based on the accelerator opening degree $\theta_{AP}$ detected by the accelerator opening degree sensor $S_1$, the engine revolution-number Ne detected by the engine revolution-number sensor $S_2$ and the vehicle speed V detected by the vehicle speed sensors $S_3$, $3_3$. The electricity-generation control means M2 controls the dynamo 5, so that when the vehicle is brought into the decelerating state, the electricity-generation control means M2 permits the dynamo to generate electricity, thereby charging the battery 4 by the generated electric power. The braking-force control means M3 controls the braking force provided by an engine brake, so that when the vehicle is brought into the decelerating state, the braking force is reduced by operating the actuator 3 to open the throttle valve 2. At this time, even if the throttle valve 2 is opened, the operation of the fuel injection valves 6 are maintained in their fuel-cutting state.

The operation of an embodiment of the present invention will be described with reference to flow charts shown in FIGS. 5 to 7.

Figure 5:
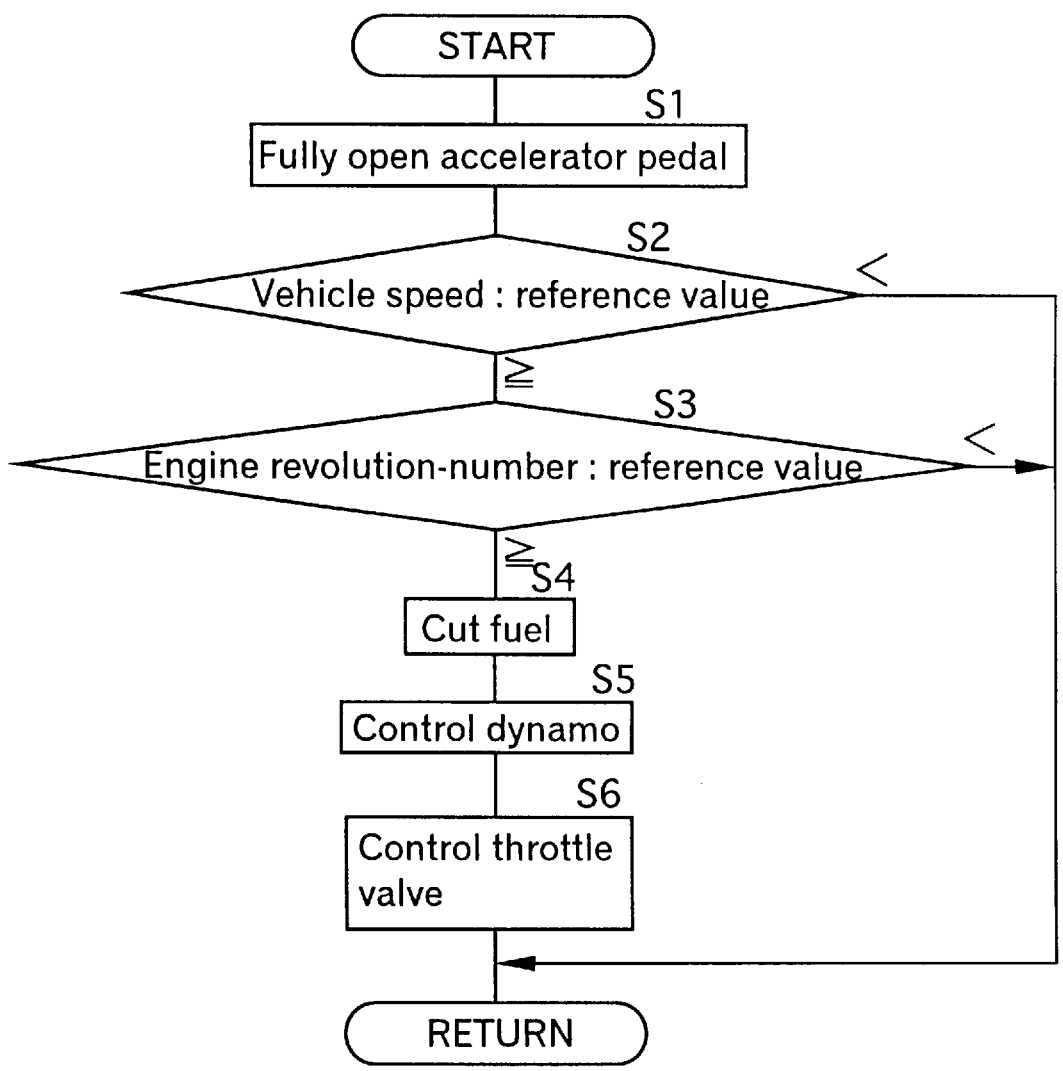
FIG. 5 is a flow chart of a main routine.

In the flow chart in FIG. 5 illustrating a main routine, when the accelerator opening degree $\theta_{AP}$ detected by the accelerator opening degree $S_1$ becomes a value corresponding to a full-closing at step S1, if the vehicle speed V detected by the vehicle speed sensors is equal to or greater than a predetermined reference value at step S2 and the engine revolution-number Ne detected by the engine revolution-number sensor $S_2$ is equal to or greater than a predetermined reference value at step S3, the decelerating-state detecting means M1 detects the fact that the vehicle is in a predetermined decelerating state.

When it is detected that the vehicle is in the speed-reduced state, the cutting of fuel which discontinues the injection of fuel from the fuel injection valves 6 is first carried out at step S4. Further, the electricity-generation control means M2 operates the dynamo 5, which is not in operation during acceleration of the vehicle or during travelling of the vehicle at a constant speed, thereby charging the battery 4, at step S5. And, the braking-force control means M3 opens the throttle valve 2 to reduce the braking force provided by the engine brake at step S6.

In this way, if the dynamo 5 is operated only during deceleration of the vehicle, no load of the dynamo 5 is applied to the engine E during acceleration of the vehicle or during travelling of the vehicle at a constant speed. Therefore, it is possible not only to enhance the accelerating performance and reduce the fuel consumption, but also to recover the kinetic energy of the vehicle, wastefully consumed by the braking during deceleration of the vehicle, as electric energy for charging the battery 4. The total braking force of the vehicle is increased by an increase in engine load resulting from driving of the dynamo 5. However, the total braking force of the vehicle is prevented from being increased and decreased by opening the throttle valve 2 in a predetermined amount from a fully-closed position at the same time to decrease the pumping load of the engine E. As a result, the deceleration of the vehicle is prevented from becoming excessive, thereby avoiding a sense of incompatibility felt by the driver.

Usually, if the throttle valve 2 is opened from its fully-closed position, the cutting of fuel is discontinued to start the injection of fuel. In this embodiment, however, even if the throttle valve 2 is opened at step S6 during deceleration of the vehicle, the vehicle is maintained in a fuel-cut state at step S4. This avoids an unintended increase in the power output by engine E and a wasteful consumption of fuel.

If the vehicle speed V is less than the reference value at step S2, or if the number Ne of revolutions of the engine is less than the reference value at step S3, the decelerating-state detecting means M1 does not detect the fact that the vehicle is in the decelerating state. This is because, even if the dynamo 5 is driven during travelling of the vehicle at a low speed, an effective amount of electric power is not provided. Moreover, there is a possibility that the engine E will stall due to an increase in load.

Figure 6:
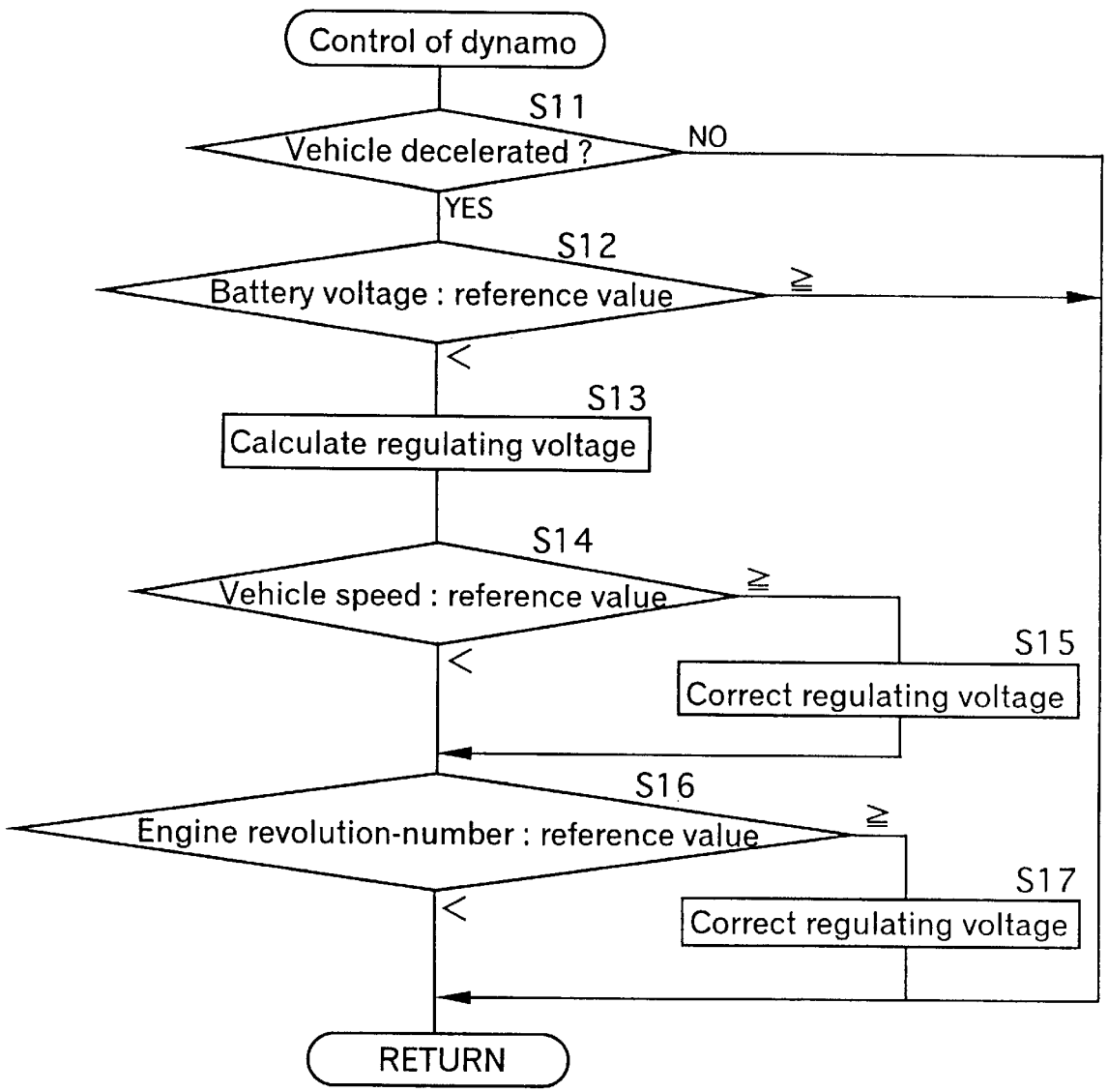
FIG. 6 is a flow chart of a dynamo control routine.

FIG. 6 is a flow chart of a sub-routine at step S5 (control of the dynamo). If the decelerating state of the vehicle is detected at step S11 and the battery voltage Vb detected by the battery voltage sensor $S_4$ is less than the reference value at step S12, a regulating voltage is determined for controlling the amount of electricity generated by the dynamo 5 by the electricity-generation control means M2 at step S13. If the vehicle speed V is equal to or greater than the reference value at step S14, the regulating voltage is corrected into a decreased value in accordance with a decrease in the vehicle speed V at step S15. If the engine revolution-number Ne is equal to or greater than the reference value at step S16, the regulating voltage is corrected into a decreased value in accordance with a decrease in the engine revolution-number Ne at step S17.

When the kinetic energy of the vehicle capable of being recovered as electric energy is great, the amount of electricity generated by the dynamo 5 is increased. Reversely, if the kinetic energy of the vehicle capable of being recovered as electric energy is small, the amount of electricity generated by the dynamo 5 is decreased. In this manner, the energy recovery rate can be enhanced to the maximum. However, when the battery voltage Vb is equal to or greater than the reference value at step S12, the dynamo 5 is not driven, and hence, when the battery 4 is in its fully-charged state, the overcharging of the battery 4 due to the driving of the dynamo 5 is prevented.

Figure 7:
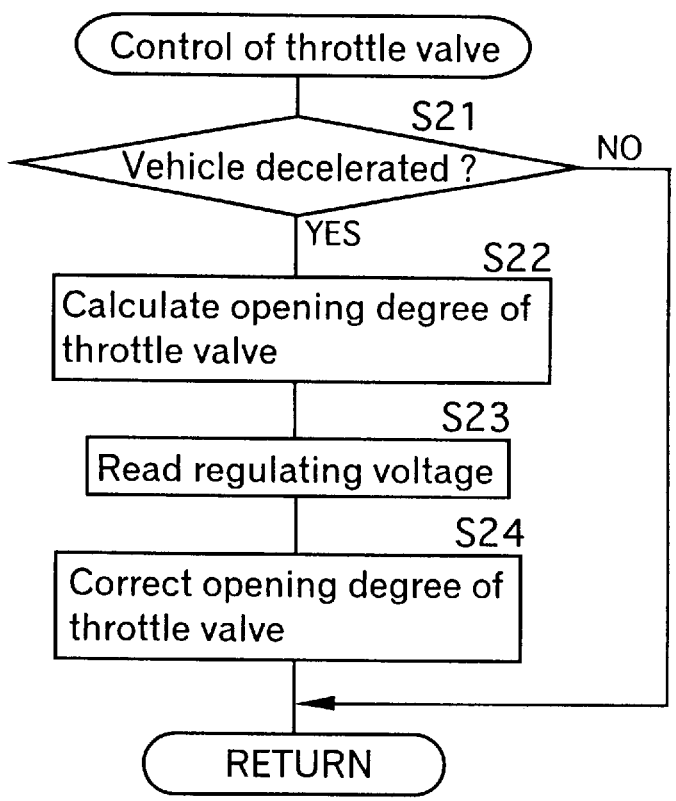
FIG. 7 is a flow chart of a throttle valve control routine.

FIG. 7 is a flow chart of a sub-routine at step S6 (control of the throttle valve). If the decelerating state of the vehicle is detected at step S21, the braking-force control means M3 calculates an opening degree of the throttle valve 2 for controlling the pumping load of the engine E at step S22. Then, the corrected regulating voltage (see steps S15 and S17) is read at step S23, and the opening degree of the throttle valve 2 is corrected in an opening direction in accordance with the corrected regulating voltage at step S24, thereby decreasing the pumping load of the engine E.

The amount of the opening degree of the throttle valve 2 corrected in the opening direction is determined so that it is equal to a magnitude off-setting the engine load increased due to the driving of the dynamo 5; namely, an increment of load provided by the dynamo 5 is equal to a decrement of pumping load of the engine E. Thus, the total braking force of the vehicle cannot be varied, and a sense of incompatibility felt by the driver is avoided.

Figure 8:
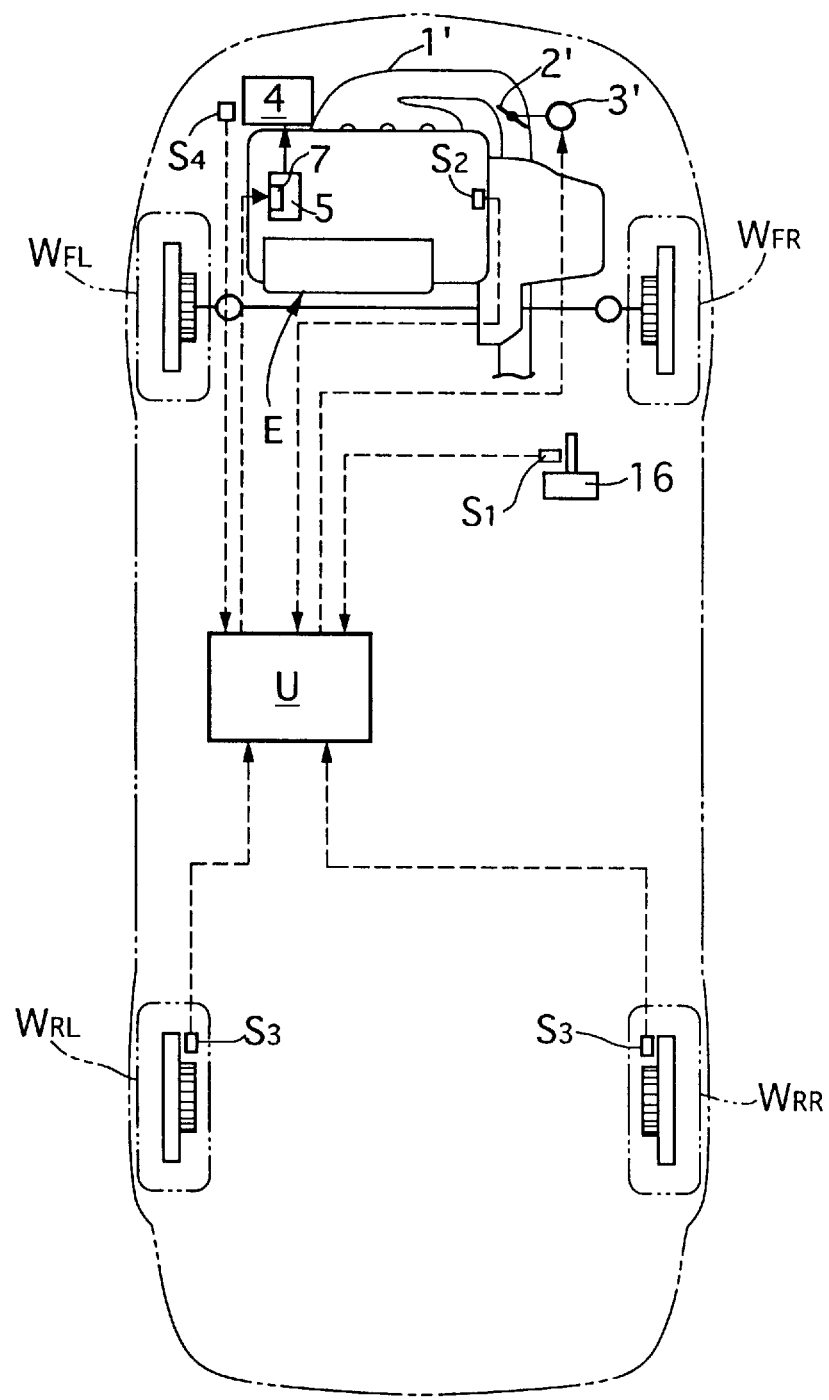
FIG. 8 is a diagrammatic illustration of the entire arrangement of a vehicle including an electricity-generation control system according to a second embodiment of the present invention.

FIG. 8 illustrates a second embodiment of the present invention. In the second embodiment, an increase in load for driving the dynamo 5 is compensated by a decrease in pumping load of the engine E provided by opening of an exhaust valve of a so-called exhaust brake, instead of being compensated by a decrease in pumping load of the engine E provided by an opening of the throttle valve 2.

This will be further described. Referring to FIG. 8, an exhaust valve 2' is provided in an exhaust passage 1' of the engine E and opened and closed by an actuator 3' which includes a pulse motor connected to the electronic control unit U. If the exhaust valve 2' is closed by the actuator 3', an exhaust gas flowing in the exhaust passage 1' is choked up to increase the pumping load of the engine E, and the resulting load acts as a braking force of the vehicle.

When the vehicle is decelerated while closing the exhaust valve 2' by the actuator 3' to operate the exhaust brake, even if a load for driving the dynamo 5 is added to apply an excessive braking force, a variation in total braking force can be prevented to avoid a sense of incompatibility felt by a driver by decreasing the braking force of the exhaust brake by opening of the exhaust valve 2' to offset the braking force provided by the driving of the dynamo 5.

Although the embodiments of the present invention have been described in detail, it will be understood that the present invention is not limited to the above-described embodiments, and various modifications in design may be made without departing from the spirit and scope of the invention defined in claims.

For example, the decelerating state of the vehicle may be detected based on the throttle opening degree, instead of being detected based on the accelerator opening degree $\theta_{AP}$.

What is claimed is:

1. An electricity-generation control system for a vehicle, comprising:

a decelerating-state detecting means for detecting a decelerating state of the vehicle;

an electricity-generation control means for controlling the electricity-generating state of a dynamo driven by an engine; and a braking-force control means for controlling a braking force generated by a pumping load of the engine by controlling an opening degree of at least one of a throttle valve provided in an intake passage of the engine and an exhaust valve provided in an exhaust passage of the engine by an actuator, wherein when said decelerating-state detecting means detects the decelerating state of the vehicle, said electricity-generation control means allows said dynamo to generate electricity, and said braking-force control means decreases the braking force in accordance with an amount of electricity generated by said dynamo.

2. An electricity-generation control system for a vehicle according to claim 1, wherein said braking-force control means cuts fuel while decreasing the braking force by controlling the opening of the throttle valve.

3. An electricity-generation control system for a vehicle according to claim 1, further including a battery voltage sensor for detecting a voltage of the battery charged by the dynamo, wherein when the detected voltage of said battery is equal to or greater than a predetermined value, said electricity-generation control means prohibits the generation of electricity by said dynamo.

4. An electricity-generation control system for a vehicle according to claim 1, wherein said decelerating-state detecting means detects the decelerating state of the vehicle when an opening degree of an accelerator is a value corresponding to a fully-closed state thereof.

5. An electricity-generation control system for a vehicle according to claim 1, wherein said decelerating-state detecting means detects the decelerating state of the vehicle when the opening degree of the throttle valve is a value corresponding to a fully-closed state thereof.

6. An electricity generation control system for a vehicle with an engine, comprising:

a decelerating-state detecting device detecting a decelerating state of the vehicle;

an electricity-generation control device controlling the generation of electricity by a dynamo driven by the engine during the decelerating state of the vehicle; and a braking-force control device controlling a braking force generated by a pumping load of the engine by varying an opening degree of at least one of a throttle valve in an intake passage of the engine and an exhaust valve in an exhaust passage of the engine based on the electricity generated by the dynamo, to compensate for a variation in the braking force caused by the generation of the electricity by the dynamo.

* * * * *